United States Patent [19]

Churgovich et al.

[11] 4,330,217
[45] May 18, 1982

[54] LINE ADJUSTMENT APPARATUS FOR A TYPEWRITER

[75] Inventors: Dennis M. Churgovich; William F. Joest, III; William R. McCray; Edward V. Rutkowski, Jr., all of Lexington, Ky.

[73] Assignee: International Business Machines Corporation, Armonk, N.Y.

[21] Appl. No.: 79,628

[22] Filed: Sep. 27, 1979

[51] Int. Cl.³ .............................................. B41J 5/30
[52] U.S. Cl. ...................................... 400/64; 364/900
[58] Field of Search ................ 400/6, 7, 10, 12, 63, 400/64, 76, 252, 279, 697.1; 364/200, 900

[56] References Cited

U.S. PATENT DOCUMENTS

| | | | |
|---|---|---|---|
| 3,297,124 | 1/1967 | Sims | 400/63 |
| 3,386,552 | 6/1968 | Lorber et al. | 400/7 |
| 3,550,091 | 12/1970 | Colgan et al. | 400/6 X |
| 3,631,957 | 1/1972 | Terry | 400/12 X |
| 3,676,853 | 7/1972 | Terry | 400/64 X |
| 3,757,921 | 9/1973 | Bishop | 400/12 X |
| 3,823,805 | 7/1974 | Richards | 400/63 |
| 3,915,278 | 10/1975 | Spence et al. | 400/64 |
| 3,998,311 | 12/1976 | Greek et al. | 400/10 X |

*Primary Examiner*—Ernest T. Wright, Jr.
*Attorney, Agent, or Firm*—George E. Grosser

[57] ABSTRACT

Line end adjustment decisions for a typewriter printing from test storage are based on a set of zones that are defined along the line respective of appearance considerations for the right margin. The potential end location for each successive word ready for addition to a line is calculated and such end location is compared to the previous word's end location, by reference to the appearance zones, for determining whether or not the word should be assigned to the next line (i.e., whether or not a carrier return is inserted). By so identifying the word end positions that bracket a word with respective corresponding zones, decision logic, based on preferred responses to the various zone combinations presentable by such end points, is enabled, effectively, to impose an overall pattern of preferred line ending decisions to establish a right margin.

For a preferred implementation, the line ending decisions for one or more of the zone combinations are further influenced by the position of the end point of the previous line, which consideration is important to the visual impression produced by the succeeding line ending point.

5 Claims, 9 Drawing Figures

LINE ADJUSTMENT APPARATUS FOR A TYPEWRITER

BACKGROUND OF THE INVENTION

1. Field of the Invention

The present invention relates to apparatus for adjusting line endings upon text playback by a typewriter with text storage capability.

2. Statement Regarding the Art

Various techniques have been developed for selecting line ending points when playing back text strings from typewriter associated storage, such a capability being important to accommodate expansions and contractions in the text that result from editing. This problem of line adjustment arises frequently because document editing generally causes text shifts which propagate through the document and make necessary a new set of carrier return decisions to define a right margin.

The usual approach to solving the line adjustment problem involves the establishment of a return zone of, for example, five spaces immediately ahead of the right margin setting, and logic is provided for inserting a carrier return at the first inter-word opportunity occurring after the start of such zone (e.g., at the first subsequent space in the text string). If a long word starts just before the return zone, it may extend beyond the right margin setting and typically logic is provided to stop playback in the event of such occurrence. The operator then decides either to hyphenate the word or to play it out so as to extend beyond the right margin.

The above-described technique is somewhat inconvenient for automatic playback. It would be desireable for the operator to be free to leave the work area while a document is being printed from text storage. If occasional hyphenation decisions are required, however, the operator must be available to make those decisions and document printing is suspended during any period when the decision request is unanswered. To reduce the inconvenience of such stoppages, some typewriters have been provided with variable width return zones so that the operator may choose a wide return zone to lessen the occurrences of operator decision situations. Such an approach will result in a less uniform right margin, however, particularly where logic is not provided to search for the last possible line return opportunity within the return zone.

A slightly different approach for defining line endings is taken with video document displays. Typically, a return zone is not established for such systems but, rather, the first break point prior to the absolute right margin is utilized and subsequent text is moved to the following line. Such an approach avoids any need for operator intervention but does not provide the potential for uniformity of the right margin that is possible using a typewriter where excursions on either side of a reference right margin point are permitted.

It is also known to allow the operator to, in effect, scan the text prior to printing and insert hyphens wherever needed to control line endings.

Some printing systems achieve line end uniformity by changing interword or even intercharacter spacing, but such an approach requires rather sophisticated logic for controlling print point shifts.

While various line adjustment techniques are known, as indicated above, improved line adjustment is desirable to permit unattended playback operation of the typewriter with a minimum of loss of right margin uniformity. Also, it is desirable to provide an adjustment system that does not require selective variation of interword spacing.

BRIEF SUMMARY OF THE INVENTION

Line adjust apparatus for defining line endings during playback of stored text string analyzes the line appearance effect of a word readied for printing by reference to a set of predefined zones along the print line. First the location of the potential line end points associated with the word are determined, preferably, by accessing a stored code indicating the end of the last word printed, as a first potential end point, and adding escapements corresponding to the stored codes representing the word to provide the second potential line end point. The end point location information is then used to control the decision regarding insertion of the carrier return ahead of the word, and such control is achieved by identifying the end point locations with corresponding predefined zones along the line, zones which are based on right margin appearance considerations. For example, one such zone is preferably defined for locations extending beyond the edge of the paper where no printing is wanted under any circumstances.

By so identifying the potential end locations with corresponding zones, a logic system is enabled to choose the line end decision, prior to printing the word, that represents the best choice, based on a pattern of preferred selections from a right margin appearance standpoint. These preferred selections are identified with the various possible pairs of zone identities presentable by such end locations and may be stored, for example, in a decision table or sequence or may be incorporated in a connected set of basic logic devices.

In a presently preferred implementation of the invention, the decision for at least one selected pair of the zone identities is influenced by the end location of the preceding line, this in recognition of the strong visual association that occurs for adjacent lines.

BRIEF DESCRIPTION OF THE DRAWING

A presently preferred implementation of the invention will now be described in detail with reference to the drawing wherein.

DETAILED DESCRIPTION OF A PRESENTLY PREFERRED IMPLEMENTATION

Figure 1:
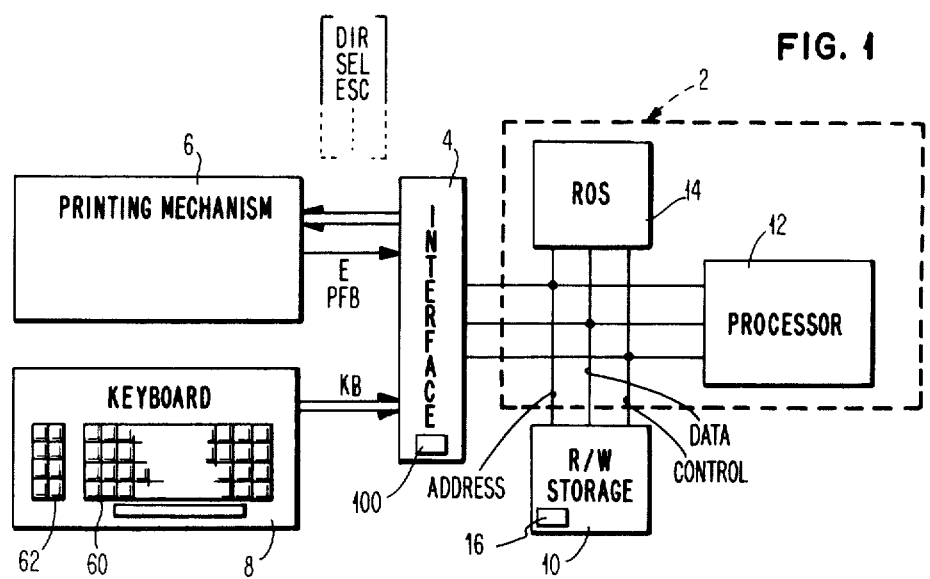
FIG. 1 is a diagram in block form indicating various instrumentalities of a typewriter suitable for implementation of the invention.

Referring to FIG. 1, a text storage typewriter suitable for use according to the invention includes an operation-controlling logic device 2 which is coupled through an interface 4 to printing apparatus 6 and keyboard apparatus 8. Accessible storage for text and other information is provided by a read/write storage device 10 that cooperates with the logic device 2. Preferably, logic device 2 comprises a sequential logic processor 12 that cooperates with a read-only-storage (ROS) 14 which embodies in coded form a set of predefined signal handling responses for the processor 12. The ROS 14 also holds fixed data used, for example, in calculations. Such a signal processing arrangement is well known in the art and is employed, for example, in IBM Electronic Typewriter Models 50 and 60.

With such an arrangement, the signal responses are, for the most part, defined by structure of the ROS 14 using various basic operations of processor 12 as building blocks. Part of the overall response characteristic is typically built into the interface 4 and the degree of pre- and post-processing of signals that occurs there is typically selected in view of cost, performance and timing considerations. It should be appreciated, however, that essentially similar response characteristics may be achieved using direct wired logic according to techniques known in the art. The processor approach merely involves a time-sharing of hardware building blocks as compared to the permanent identification of logic devices to respective branches of a fixed logic system.

Figure 2:
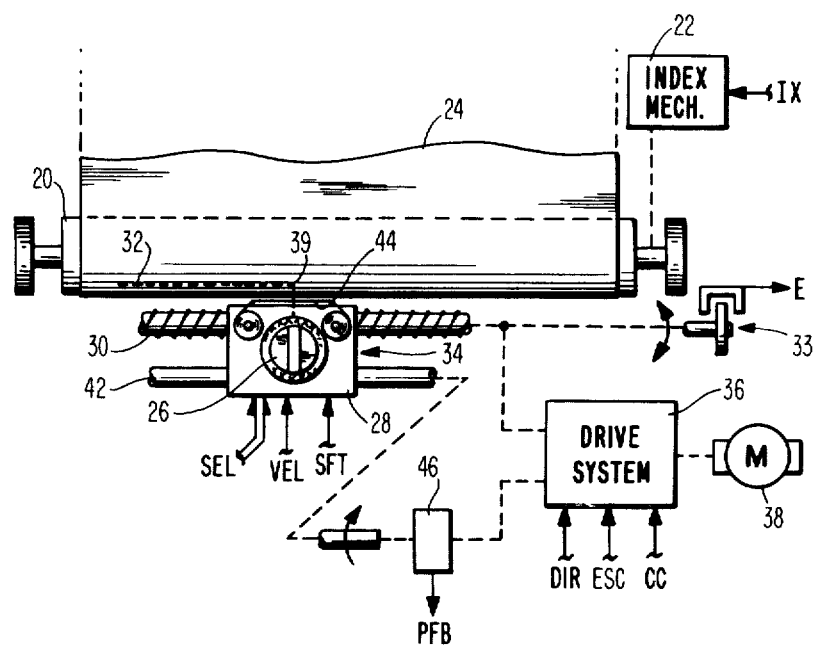
FIG. 2 is a simplified partial plan view of a printer suitable for implementation of the invention.

Printing apparatus 6 may take various known forms and, may, for example, be a conventional single element impact printer or a typebar printer or even a matrix printer such as an ink jet printer. Referring to FIG. 2, a presently preferred kind of printing apparatus 6 to cooperate in an implementation of the invention includes paper feed means such as a platen 20 (and associated feed rollers not shown). The platen 20 is coupled to an indexing device 22 that responds to a signal IX to cause incremental rotation for advancing an inserted medium such as a sheet of paper 24 along a feed path.

A character forming element 26 is mounted on a support 28 that cooperates with linear drive apparatus such as a lead screw 30 to be moveable parallel to the platen 20 for defining a line 32 for printing. Position along such line is indicated by a signal E produced by a motion detector 33 that is coupled to the lead screw 30.

The element 26 and support 28 taken together comprise a carrier 34 which is controllably positioned along a print line 32 by a drive system 36 that responds to control and direction signals ESC and DIR, respectively, in transmitting motion from a motor 38 to the lead screw 30. Actual printing at a present printing position 39 is effected using selection and impacting means (not shown) that cooperate with element 26 and respond to selection and velocity signals indicated as SEL and VEL, respectively. An upper case/lower case shift operation is also provided in response to a signal SFT.

Power for printing is supplied by a print shaft 42 that is rotated by the drive system 36 in response to a signal CC. A cam and follower system (not shown) transfers motion for selection and impacting of element 26. A ribbon carrier and associated drive device (not shown) hold a ribbon 44 between the element 26 and the platen 20 for making an ink impression on the paper 24. A detector 46 that cooperates with print shaft 42 serves to indicate when a print cycle is completed by means of a printer feedback signal PFB.

The various signals mentioned above regarding the printing apparatus 6 are preferably routed through the interface 4 (see FIG. 1).

The above-described kind of printing apparatus 6 is well known in the art and, as was mentioned above, is described as environment for the invention. Such a printing apparatus 6 is exemplified in the IBM Electronic Typewriter Models 50 and 60. A more detailed description of such a printing apparatus 6 is provided in the IBM Electronic Typewriter Service Manual.

Figure 4:
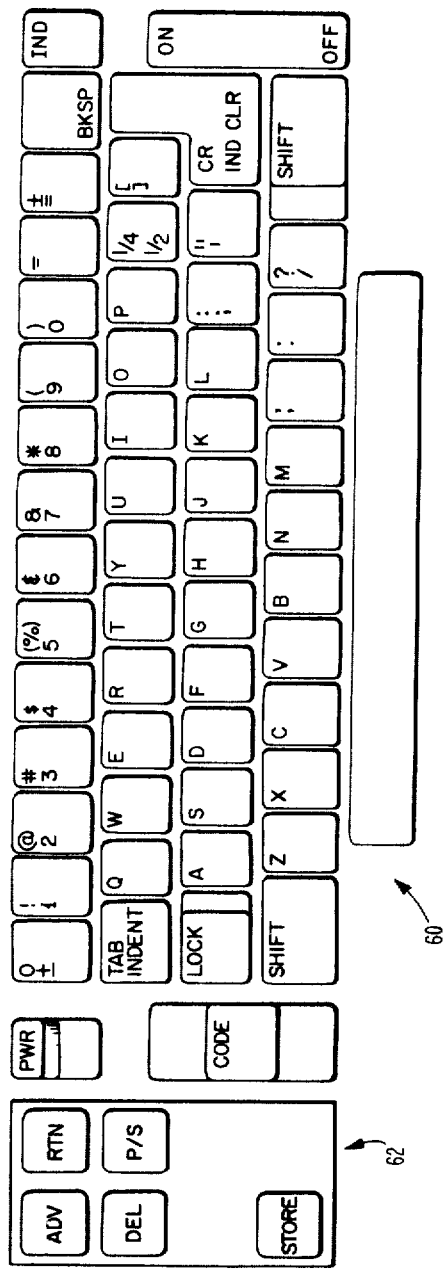
FIG. 4 is a simplified plan view of a keyboard.

Referring to FIGS. 1 and 4, the keyboard apparatus 8 serves as an input device for an operator and produces coded signals KB responsive to depressions of individual keys or selected combinations thereof.

Included among the keys for a main keyboard area 60 are alphabetic keys, numeric keys, punctuation keys, a carrier return key, a hyphen key, and a spacebar.

An auxiliary keyboard area 62 preferably includes ADVANCE, DELETE, RETURN, PLAY/STOP (P/S), and STORE keys which initiate modes for recording, playback and editing of text strings. Various stored codes for the presently preferred implementation are indicated in part in Table 1. It will be appreciated, however, that various coding plans are possible.

TABLE 1

| STORED CODE IN HEXADECIMAL | PRINTING OPERATION REPRESENTED |
|---|---|
| 00 | Null |
| 06 | Space |
| 08 | Index |
| 0C | Discretionary Carrier Return |
| 0D | Required Carrier Return |
| 10-6F | Graphics |
| 70 | Syllable Hyphen |
| 86 | Coded Space |
| 8E | Backspace |
| 9A | Word Double Underscore |
| 9B | Multiple Word Double Underscore |
| 9C | Stop Code |
| C2 | Coded Hyphen |
| D6 | Word Underscore |
| D7 | Multiple Word Underscore |
| EE | Continuous Underscore |
| F0 | Tab |
| F1 | "Negative" Tab |
| F2 | Indent Tab |
| F3 | "Negative" Indent Tab |
| F4 | Multiple Backspace |
| F6 | Indent Clear |
| FF | Separator, separates phrases in the text |
| 42 | Normal Hyphen |

Certain stored codes are converted from the code produced by the keyboard apparatus 8 and certain keyboard codes of particular interest are indicated in Table 2.

TABLE 2

| CODE (HEXADECIMAL) | OPERATION REPRESENTED |
|---|---|
| 42 | Normal Hyphen |
| 04-05 | Tab |
| 0C-0D | Carrier Return |
| 8C-8D | Indent Clear |

The monitoring of printer position is important to the invention and, accordingly, a brief discussion of known techniques for determining the present printing position will be provided.

It is possible to directly detect printing position using position encoders and such encoders are known which produce either digital or analog output signals. For typewriters, however, it is more usual to provide a detector which indicates increments of motion, for example, using a disc having radial metering marks and cooperates with a photodetector (indicated in simplified form as detector 33, FIG. 3) to indicate position shifts.

With such an approach, logic located in the processor 12 (see FIG. 1) maintains a count (PPOS) in a specific storage location 16 that is indicative of the present printing position. Using a presently preferred technique for maintaining the stored count (PPOS) indicative of a present printing position, the processor 12 determines the total change to the position count corresponding to a commanded operation, e.g., printing of a character, and updates the position count without regard to printer operation. The count change, however, is written into a counter 50 (FIG. 3) of interface 4 using a decoder 52 which responds to an address code assigned to direction and position increment data. The counter 50 and the decoder 52 then send commands ESC and DIR to the drive system 36 of printing apparatus 6 until the count total is reduced to zero by the feedback pulses E from detector 33. This type of print position monitoring and control is similar to that used in the IBM Electronic Typewriter Model 50.

Figure 3:
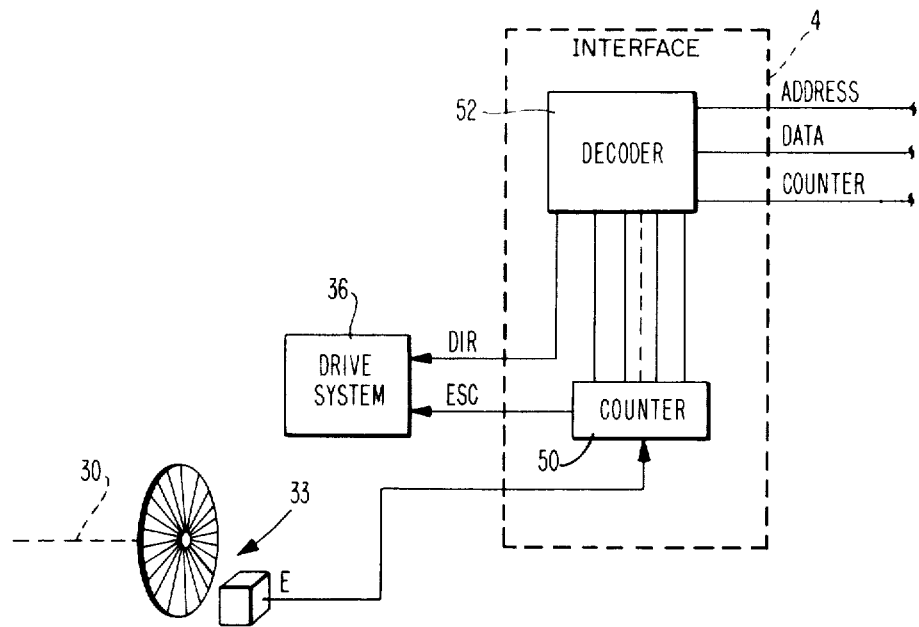
FIG. 3 is a diagram mainly in block form for indicating apparatus for controlling the shifting of a print point for printing apparatus.

Right and left margin positions for such printers are identified by coded position numbers which are referenced to increments for the detector 33 (FIGS. 1 and 3). Typically, the position numbers are stored at dedicated locations in the read/write storage device 10 and are selectable by the operator at the keyboard apparatus 8. The IBM Model 50 and 60 Electronic typewriters, for example, provide for such selection of right and left margin positions.

Figure 5:
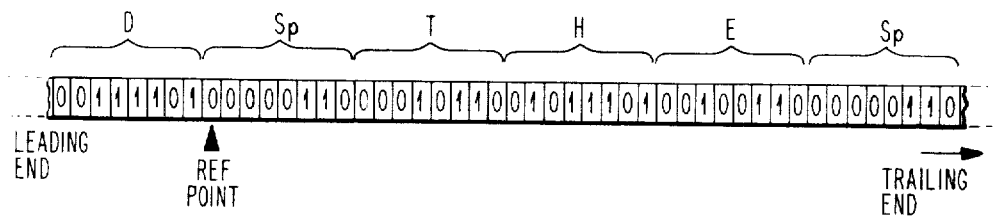
FIG. 5 is a diagram for indicating a text string stored in coded form in a read/write storage.

Referring to FIG. 5, a string of code in storage is indicated diagrammatically with a reference point which is the present active text storage address and might be compared to a cursor for a display. Preferably, a gap of vacant storage is located at the reference point. Addresses for the leading and trailing end of the gap (the addresses for storage locations $M_p$ and $M_r$, to be referenced below) are stored in pointer variables to define the reference point. With such a gap, characters may be added within a document, e.g. when editing, without forcing the trailing codes in storage to be "pushed down" to leave the needed storage space and, accordingly, storage operations may be performed more rapidly.

Figure 6:
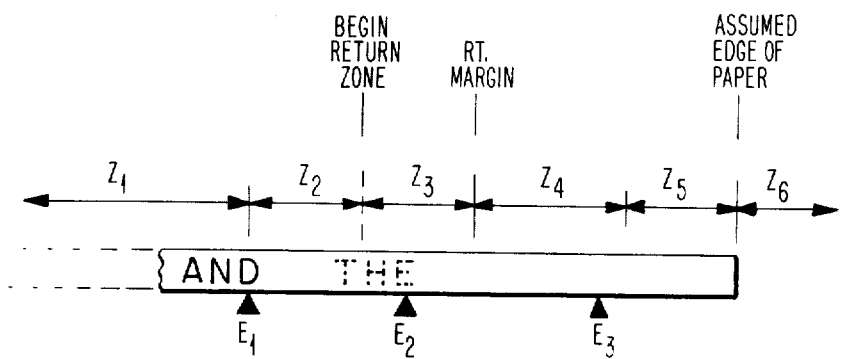
FIG. 6 is a diagram to indicate zones defined in relation to a printing line.

Referring to FIG. 6, a line of print is diagramatically indicated and zones for use according to the invention are identified. Preferably, six zones ($Z_1$-$Z_6$) are defined and one of the zones (Zone $Z_3$, FIG. 6) is the usual "return zone" $Z_3$ for automatic carrier return logic that is active during processing of codes from the keyboard, e.g. the five positions before the right margin. Two other preferred zones (Z2 and Z4) are to either side of the return zone $Z_3$ and, in effect, define the second level of desirable line end points. It is preferred to define these zones relative to the right margin so that the zones will shift as the right margin shifts. A zone ($Z_6$) is defined to start at the edge of a normal sized sheet of paper 24 and serves to identify a line area where no printing should occur. The remaining zones (Z1 and Z5) fill out the rest of the line so that the full range of possibilities is identified.

Significant end points for printing are indicated by arrows below the line. The point $E_1$ is the end point for the last word printed whereas point $E_2$ is the end for the word readied for printing (dashed lines for the word "THE" serve to indicate printing has not yet occurred). Also indicated is the end point ($E_3$) for the last word of the previous line. These end points are preferably identified by a print position number in terms of increments defined by the detector 33 (FIG. 1) and are stored at particular locations in storage device 10.

Now referring to Table 3, the decision regarding whether a carrier return will be inserted or whether, alternatively, the readied word will be printed is based on a logic table of preferred choices that is embodied in logic device 2 (FIG. 1). Each of the possible combinations of $E_1$, $E_2$ and $E_3$ has a preferred result. Since, of course, a preceding word can't be to the right of its succeeding word, certain zone combinations are not possible. For the presently preferred implementation, only the decision for combinations involving the zone preceding the return zone ($Z_2$) and that following the return zone ($Z_4$) are controlled based on the position $E_3$ of the previous line's end point.

TABLE 3

| DECISION TABLE | | | |
|---|---|---|---|
| ZONE OF $E_1$ | ZONE OF $E_2$ | ZONE OF $E_3$ | INSERT CARRIER RETURN |
| $Z_1$ | $Z_1$ | * | N |
| $Z_1$ | $Z_2$ | * | N |
| $Z_1$ | $Z_3$ | * | N |
| $Z_1$ | $Z_4$ | * | N |
| $Z_1$ | $Z_5$ | * | N |
| $Z_1$ | $Z_6$ | * | Y |
| $Z_2$ | $Z_2$ | * | N |
| $Z_2$ | $Z_3$ | * | N |
| $Z_2$ | $Z_4$ | $Z_2$ | Y |
| $Z_2$ | $Z_4$ | $Z_{1,3,5,6}$ | ** |
| $Z_2$ | $Z_4$ | $Z_4$ | N |
| $Z_2$ | $Z_5$ | * | Y |
| $Z_2$ | $Z_6$ | * | Y |
| $Z_3$ | $Z_3$ | * | Y |
| $Z_3$ | $Z_4$ | * | Y |
| $Z_3$ | $Z_5$ | * | Y |
| $Z_3$ | $Z_6$ | * | Y |
| $Z_4$ | $Z_4$ | * | Y |
| $Z_4$ | $Z_5$ | * | Y |
| $Z_4$ | $Z_6$ | * | Y |
| $Z_5$ | $Z_5$ | * | Y |
| $Z_5$ | $Z_6$ | * | Y |

** - Y if $E_1$ is closer to $Z_3$; N if $E_2$ is closer to $Z_3$
* - NO EFFECT
Y - YES
N - NO Presently preferred logic for incorporating the invention will now be described in detail with reference to a flowchart (FIG. 7) and logic definition (Logic Tables 1-17) in terms of a structured programming language. The structured programming language transcends the variation in mnemonics that may occur from processor to processor and such definition provides the information necessary for those skilled in the art to produce logic device structures, e.g. cooperating ROS processor structures for practicing the invention. Descriptive variable names have been used in the Logic Tables to make them essentially self-descriptive; however, a brief description of each table is provided.

Figure 7:
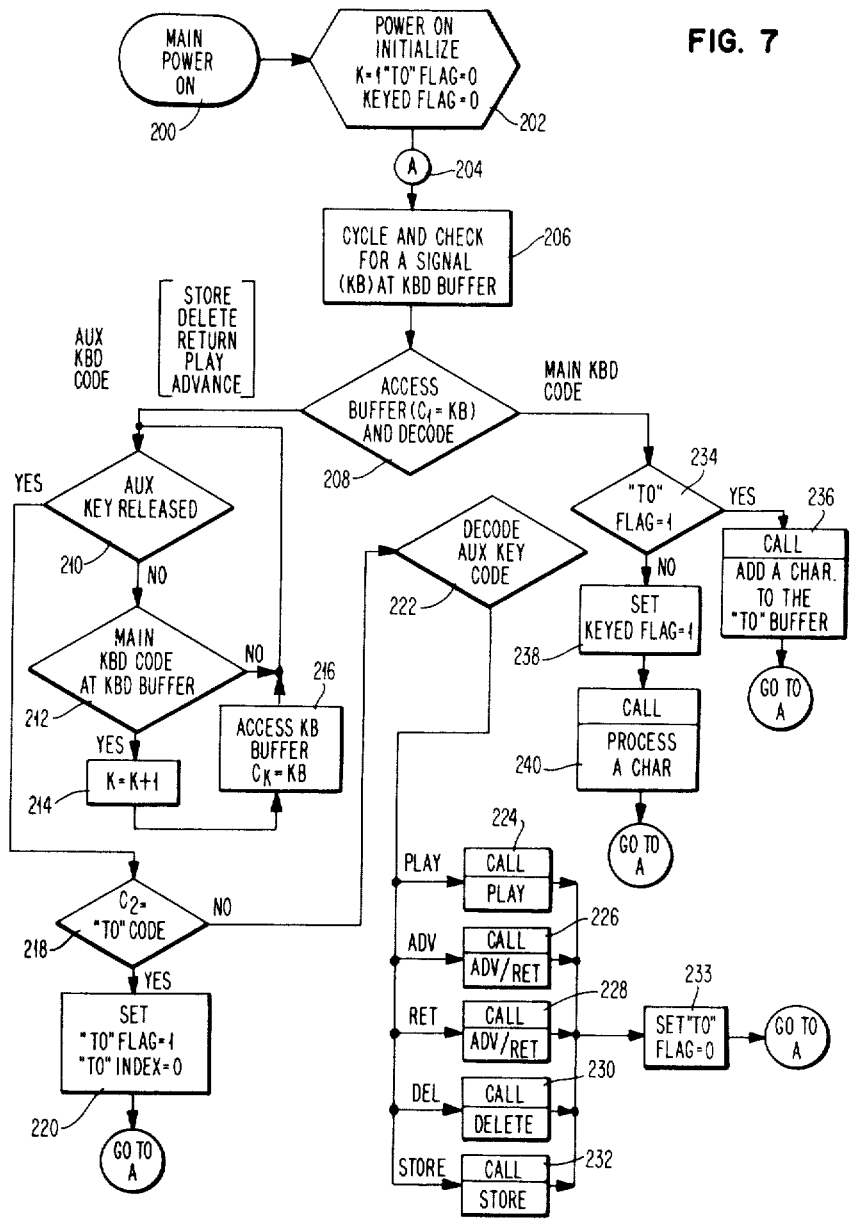
FIG. 7 is a flow chart indicating the main logic organization for the presently preferred implementation.
Figure 8:
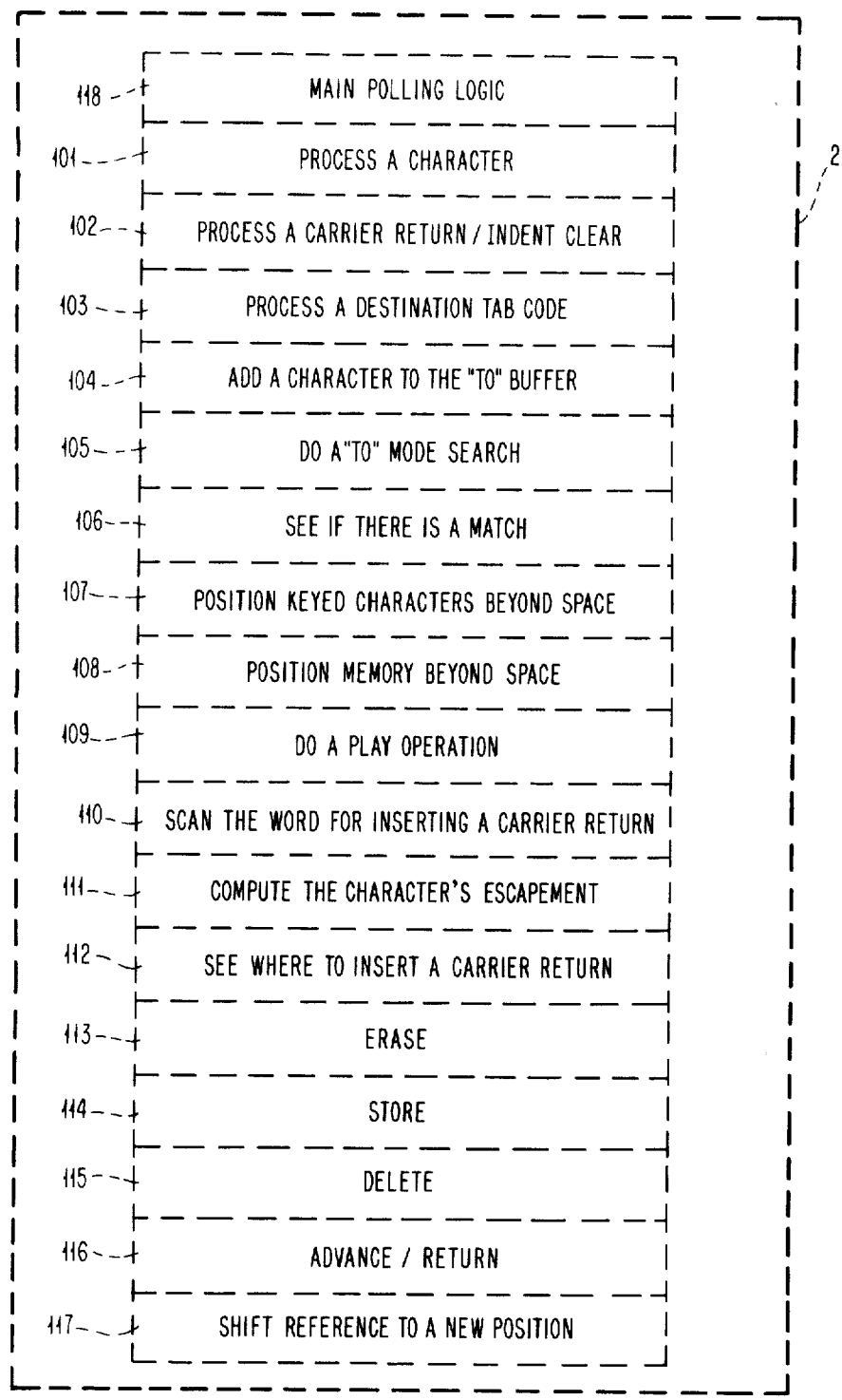
FIG. 8 is a block diagram indicating signal processing logic partitioned according to subroutine organization.

Referring to FIG. 8, the signal processing structured into the logic device 2 is represented according to partitioning by subroutine organization to include partitioned logic 101-118 which is described below in detail with reference to Logic Tables 1-17 and FIG. 7, respectively.

Referring to FIG. 7, the main polling logic that is incorporated in the structure of logic device 2 is indicated diagramatically. Such logic structure serves to coordinate the processing of signals KB that arrive at a keyboard buffer 100 of interface 4.

When the machine power is switched on (Block 200), an initialization of flags and index values occurs (Block 202). After an entry point A (Block 204), a repeated check is maintained for a signal at the keyboard buffer 100 (Block 206). Upon detecting a signal at buffer 100, e.g. using an accessed flag at a preselected interface register or an interrupt signal on the control bus, the keyboard buffer 100 is accessed and the keyboard signal (KB) is stored in a stored variable denoted $C_1$ and is decoded (Block 208).

An initial distinction is made between codes from the auxiliary keyboard 62 (which preferably control operations with text storage) and codes from the main keyboard 60. The auxiliary keyboard selections are preferably indicated by single bit codes, whereas the main keyboard 60 preferably represents selections as eight bit codes. For auxiliary keyboard codes, it is further determined whether a main keyboard key is depressed while the auxiliary keyboard key remains depressed. If so, the index K is incremented and the code is stored as $C_K$ (Blocks 210–216).

Once the auxiliary keyboard key is released, a check is made to determine if a content-addressed search (the "TO" mode) has been selected (Block 218) in which case a "TO" flag and a "TO" index for use in the search operations are set (Block 220). If a search is not selected, a branch to appropriate logic for the selected mode (PLAY, ADVANCE, RETURN, DELETE or STORE) is effected (Blocks 222-232). Upon returning from one of the mode operations (Blocks 222-232), the TO FLAG is reset (Block 233).

If a main keyboard code is detected for the signal processing described at Block 208, the "TO" flag is checked (Block 234) to determine if a search address is being keyboarded. If so, a branch operation is effected to logic for adding codes to the search address buffer which is labeled as the "TO" buffer (Block 236). Such buffer is preferably a series of locations of the storage device 10 (FIG. 1) and the logic for storage of a text address is described more fully below.

For the situation where, for the test at Block 234, a search address is not being keyboarded ("TO" flag=0), a flag (denoted "Keyed Flag") indicating the occurrence of a keyed character is set to a preselected state (Block 238) and a branch operation (Block 240) to logic for processing a character (described below) is initiated. Descriptions of the blocks of logic entered by branching from the main polling loop (FIG. 7) are provided below in terms of a structured programming language. It is assumed that storage locations for stored code (denoted M) are sequential and that a storage section having empty storage has been created at the reference point to permit code additions and deletions without constant shifting of trailing codes. Pointers p and r indicate the beginning and end of the empty section. New code is added at location Mp and during playback from storage, a code progresses from the location $M_r$ to $M_p$ as it is played and pointers r and p are incremented for the next code.

Referring to Logic Table 1, the logic 101 which is entered from block 240 (FIG. 7) is described in structured programming language. Section 1 performs tests based on the beginning of the return zone (e.g. right margin count—count for 5 character positions) and the nature of the present and preceding code are checked in order to determine if a carrier return should be inserted to establish a line end point. If so, a transfer occurs to carrier return processing logic 102 described below.

Section 2 detects hyphen codes and sets flags to indicate whether or not the hyphen is keyed by operator. At Section 3, a flag is set and a transfer to special carrier return processing logic 102 occurs if the code being processed is a carrier return code. Tab and indent tab codes are detected in Section 4 and the tab destination is stored in the variable "TAB DESTINATION". The variable TAB DESTINATION is adjusted to be measured relative to the left margin at Sections 4a and 4b. The tab code itself is converted to a destination tab identifier at sections 4a and 4b, which identifier codes correspond to either a positive destination tab ($F0_{16}$), a positive indent tab ($F2_{16}$), a negative destination tab ($F1_{16}$) or a negative indent tab ($F3_{16}$). (The subscript "16" is used to indicate numbers to the base sixteen.)

At Section 5, a transfer is initiated to logic 103 for processing a destination tab code (described below). A test for an erase code is provided in Section 6 and a transfer to erase logic 113 (described below) occurs if an erase code is presented. The processing of an indent clear code is treated in Section 7. For Section 8, all special codes already eliminated by Sections 1-7 and normal character processing may occur. The position of the last graphic printed $E_1$ is updated if appropriate for use with the carrier return insertion logic (Logic Table 12).

LOGIC TABLE 1

| | Process a Character |
|---|---|
| Sec 1 | IF PPOS > (RT margin - 5) and $C_1$ = graphic and $M_p$ = space code or hyphen code |
| • | THEN set the INSERTED CARRIER RETURN FLAG = 1 |
| • | CALL (Process a Carrier Return/Indent Clear) |
| • | ENDIF |
| Sec 2 | IF $C_1$ = hyphen code |
| • | THEN IF the KEYED FLAG = 1 |
| • | THEN set the HYPHEN KEYED FLAG TO 1 |
| • | ELSE set the HYPHEN KEYED FLAG TO 0 |
| • | ENDIF |
| • | Send print hyphen command to interface 4 |
| • | Set $E_1$ = PPOS |
| • | IF the STORE FLAG = 1 |
| | THEN set $M_p$ = regular hyphen code |
| • | ENDIF |
| Sec 3 | ELSE IF $C_1$ = carrier return code |
| • | THEN set the INSERTED CARRIER RETURN flag to 0 |
| • | CALL (Process a Carrier Return) |
| Sec 4 | ELSE IF $C_1$ = keyboard tab code or a keyboard indent tab code |
| • | THEN Search active tab storage for first entry greater than PPOS and store in TAB DESTINATION |
| Sec 4a | IF the location is at or beyond the left margin (LM) |
| • | THEN set TAB DESTINATION = TAB DESTINATION - LM |
| • | set $C_1$ = positive tab code (F0) (F2 if indent) |
| Sec 4b | ELSE set TAB DESTINATION = LEFT MARGIN - TAB DESTINATION |
| • | SET $C_1$ = negative tab code (F1) (F3 if indent) |
| • | ENDIF |
| • | ENDIF |

LOGIC TABLE 1-continued

Process a Character

| | |
|---|---|
| Sec 5 | IF $C_1$ = a destination tab code (F0 to F3) |
| • | THEN CALL (Process a Destination Tab Code) |
| Sec 6 | ELSE IF C = erase code (OE or OF) |
| • | THEN CALL (Erase) |
| Sec 7 | ELSE IF $C_1$ = Keyboard Indent Clear Code (8C or 8D) |
| • | THEN set $C_1$ = Stored indent clear code (F6) |
| • | ENDIF |
| • | IF $C_1$ = Stored indent clear code (F6) |
| • | THEN CALL (Process a Carrier Return/Indent Clear) |
| Sec 8 | ELSE process code normally |
| • | IF $C_1$ = graphic code |
| • | THEN set $E_1$ = PPOS |
| • | ENDIF |
| • | ENDIF |
| • | ENDIF |
| • | ENDIF |
| • | ENDIF |
| • | ENDIF |
| • | RETURN |

Referring to Logic Table 2, carrier return processing logic 102 at Section 1 tests to determine if the carrier return was automatically inserted. If so, control skips to Section 4 and the carrier return is processed. If not, a temporary index m is set up for the present reference location.

In Section 2, a test is made for an underscore code and the temporary index M is shifted behind any such codes.

Section 3 tests for a normal hyphen code ($42_{16}$) and backs over any preceding multiple word underscore codes at Section 3a. Section 3b includes a logic test relating to the position and context of the hyphen to determine if it is to be converted to a syllable hyphen (coded as $70_{16}$). If the preceding character is a graphic code other than the hyphen code and the hyphen was keyed and the carrier return was keyed (as determined from the state of previously set flag variable (HYPHEN KEYED FLAG and KEYED FLAG) and the hyphen printed beyond the start of the return zone (PPOS≦Rt Margin−5), then the hyphen code is converted. Section 4 resets the left margin for an indent clear operation. Section 5 causes commands the carrier return operation and sets the indicators $E_1$ and $E_3$ to revised end of last word on line and end of last line positions, respectively.

LOGIC TABLE 2

Process a Carrier Return/Indent Clear

| | |
|---|---|
| Sec 1 | IF $C_1$ = carrier return code (OC or OD) |
| • | THEN IF the INSERTED CARRIER RETURN FLAG = O |
| • | THEN set m = p |
| Sec 2 | WHILE $M_m$ = word underscore code or multiple word underscore code |
| • | DO |
| • | set m = m − 1 |
| • | ENDWHILE |
| Sec 3 | IF $M_m$ = hyphen code |
| • | THEN set n = m − 1 |
| Sec 3a | WHILE $M_n$ = multiple word underscore code |
| • | DO |
| • | set n = n − 1 |
| • | ENDWHILE |
| Sec 3b | IF $M_n$ = word underscore code or graphic code other than the hyphen code AND |
| • | the KEYED HYPHEN FLAG = 1 |
| • | AND a character has printed |

LOGIC TABLE 2-continued

Process a Carrier Return/Indent Clear

| | |
|---|---|
| • | beyond RT margin - 5 AND |
| • | the KEYED flag = 1 |
| • | THEN set $M_m$ = syllable hyphen code |
| • | ENDIF |
| • | ENDIF |
| • | Set $M_p$ = carrier return code |
| Sec 4 | ESLE set $M_p$ = $C_1$ (F6) |
| • | set p = p+1 |
| • | set $M_p$ = ACTIVE LEFT MARGIN |
| • | set p = p+1 |
| • | set $M_p$ = $C_1$ |
| • | set ACTIVE LEFT MARGIN = PERMANENT LEFT MARGIN |
| • | ENDIF |
| Sec 5 | set $E_3$ = $E_1$ |
| • | set DELTA = PPOS - ACTIVE LEFT MARGIN |
| • | send DELTA positioning data to decoder 52 (FIG. 3) |
| • | Set $E_1$ = 0 |
| • | RETURN |

Referring to Logic Table 3, the process a destination tab code logic 103 referenced in Section 5 of Logic Table 1 begins at Section 1 by relating the absolute destination to the left margin. Section 2 sets up the travel distance for the tab in the variable TAB SPACE COUNT and Section 3 signals an error if such distance is negative. In Section 3a, a shift distance count and a direction are sent to the decoder 52 of interface 4. If the count for the tabs is in character positions, such count must be scaled to correspond to pulses E of detector 33 (FIG. 3).

In Section 4, index p is incremented to produce a multi-section tab code in storage that indicates tab destination and travel distance. For an indent tab code ($F2_{16}$ or $F3_{16}$) the value for the current left margin is also stored in the multi-section code at Section 4a. The margin is changed to the new margin value at Section 4b. The trailing identifier code is added at Section 5.

LOGIC TABLE 3

Process a Destination Tab Code

| | |
|---|---|
| Sec 1 | IF $C_1$ is a positive tab code (F0 or F2) |
| • | THEN compute ABSOLUTE DESTINATION = LEFT MARGIN + TAB DESTINATION |
| Sec 1a | ELSE compute ABSOLUTE DESTINATION = LEFT MARGIN - TAB DESTINATION |
| • | ENDIF |
| Sec 2 | set TAB SPACE COUNT = ABSOLUTE DESTINATION - PPOS |
| Sec 3 | IF TAB SPACE COUNT ≦ 0 |
| • | THEN set TAB SPACE COUNT = 0 |
| • | signal interface 4 to cause a thump (no motion) |
| Sec 3a | ELSE send the tab space count to the decoder 52 Interface 4 and set PPOS = ABSOLUTE DESTINATION |
| • | ENDIF |
| Sec 4 | set p = P + 1 |
| • | set $M_p$ = $C_1$ (which has a value F0, F1, F2 or F3) |
| • | set p = p + 1 |
| • | set $M_p$ = TAB SPACE COUNT |
| • | set p = p + 1 |
| • | set $M_p$ = TAB DESTINATION |
| • | set p = p + 1 |
| Sec 4a | IF $C_1$ = F2 or F3 |
| • | THEN set $M_p$ = ACTIVE LEFT MARGIN |
| • | set p = p + 1 |
| • | ENDIF |
| Sec 4b | IF $M_p$ = F2 or F3 |
| • | THEN set ACTIVE LEFT MARGIN = PPOS |
| • | ENDIF |
| Sec 5 | Set $M_p$ = $C_1$ |
| • | RETURN |

Logic Table 4 describes logic 104 for adding a character to the address for a content-addressed search (TO) operation. At Section 1, an erase code triggers a decrementing of the search address index (i) to remove a character from the stored address ($T_i$), and indicates when the operation is completed. As is well known, an operator perceivable indication such as a vibration or "thump" may be provided by triggering a solenoid (not shown) or by oscillating the carrier 34 using the drive system 36. A case shift request is processed at Section 2 and Section 3 defines the maximum length for the address text string. Section 4 coordinates the processing of codes representing a graphic.

In particular, Section 4a equates the coded hyphen and the regular hyphen to the regular hyphen code for search comparison purposes. Then Section 4b increments the index i and stores the code using the identifier $T_i$. Section 4c equates all of the codes causing a print position shift to a single space code for purposes of comparison for a content-addressed search. Section 5 causes a code that does not represent a valid search address entry to be ignored.

LOGIC TABLE 4
Add a Character to the To Buffer

| | |
|---|---|
| Sec 1 | IF $C_1$ = erase code |
| • | THEN IF i ≠ 0 |
| • | THEN set i = i − 1 |
| • | thump |
| • | ENDIF |
| Sec 2 | ELSE IF $C_1$ = SHIFT |
| • | THEN send a command to the interface 4 to shift the printer case (upper or lower) |
| Sec 3 | ELSE IF i = MAX (the maximum length text address permitted) |
| • | THEN ignore $C_1$ (no entry in storage occurs) |
| Sec 4 | ELSE IF $C_1$ = a graphic code |
| Sec 4a | THEN IF $C_1$ = coded hyphen code |
| • | THEN set $C_1$ = regular hyphen code |
| • | ENDIF |
| Sec 4b | set i = i + 1 |
| • | set $T_i$ = $C_1$ |
| • | thump |
| Sec 4c | ELSE IF $C_1$ = space code, coded space code, tab code, coded tab code, |
| • | THEN set i = i + 1 |
| • | set $T_i$ = space code |
| • | thump |
| Sec 5 | ELSE ignore $C_1$ (no entry in storage occurs) |
| • | ENDIF |
| • | ENDIF |
| • | ENDIF |
| • | ENDIF |
| • | ENDIF |
| • | RETURN |

Logic 105 for performing a content-addressed search is described in Logic Table 5. At Section 1, an index t is initialized with the length of the search address and condition indicating variables (flags) are initialized.

Sections 2–2f define a loop for comparing line beginnings with the stored address. At Section 2a, it is determined if the search is to be toward the leading end of the text string (RETURN mode) and if so, the index i and the indexing direction control variable (j) are initialized accordingly. The index i and direction control variable are initialized for a search toward the trailing end of a text string at Section 2b. In Section 2c, a temporary variable (S) receives a stored code $M_i$ and a temporary index (k) receives the value of index i.

Stepping to the next line is performed at Section 2d. If no more lines are available for testing, an error flag is set at Section 2e, and a command for an indication of error is sent to interface 4, e.g. an alarm address is asserted by logic device 2 to cause interface 4 to actuate an operator perceivable indicator (not shown) as is well known. At Section 2f, a branch to code comparison logic (described below) is initiated.

In Section 3, operator selected operations (PLAY, ADVANCE, RETURN or DELETE) are completed relative to the addressed point in the text string if a matching text segment has been found.

LOGIC TABLE 5
Do "TO" Mode Search

| | |
|---|---|
| Sec 1 | set t = i (number of characters keyed in "TO" mode) |
| • | set ERROR FLAG = 0 |
| • | set "TO" FLAG = 0 |
| • | set MATCH FAIL FLAG = 1 |
| Sec 2 | WHILE ERROR FLAG = 0 AND MATCH FAIL FLAG = 1 |
| • | DO |
| Sec 2a | IF $C_1$ = return code |
| • | THEN set i = p − 1 |
| • | set j = −1 |
| Sec 2b | ELSE set i = r |
| • | set j = +1 |
| • | ENDIF |
| Sec 2c | set S = $M_i$ |
| • | set k = i |
| Sec 2d | WHILE S ≠ separator AND |
| • | S ≠ carrier return code, required carrier return code, indent clear code, or index code |
| • | DO |
| • | IF S = (one of multiple byte codes) |
| • | THEN set i = i + j * (length of code − 1) |
| • | ENDIF |
| • | set S + $M_i$ |
| • | set i = i + j |
| • | ENDWHILE |
| Sec 2e | IF i = k |
| • | THEN set ERROR FLAG = 1 and CALL (alarm) |
| Sec 2f | Else i = i + 1 |
| • | set q = i |
| • | CALL (See If There is a Match) |
| • | ENDIF |
| • | ENDWHILE |
| Sec 3 | IF MATCH FAIL FLAG = 0 |
| • | THEN IF $C_1$ = Play code |
| • | THEN CALL (Do a Play Operation) |
| • | ELSE IF $C_1$ = Advance or Return Code |
| • | THEN CALL (Do an Advance/Return Operation) |
| • | ELSE IF $C_1$ = DELETE CODE |
| • | THEN CALL (Do a Delete Operation) |
| • | ENDIF |
| • | ENDIF |
| • | ENDIF |
| • | ENDIF |
| • | RETURN |

Referring to Logic Table 6, logic 106 for testing codes for a match to the stored address $T_i$ initializes, at Section 1, flags for indicating the success state of the matching operation. Sections 2–2g define a loop that successively tests codes in a line for a match to the address codes stored in variable $T_k$. Section 2a recognizes space codes in the address string and, in effect, equates them to a single space code for comparison purposes. A temporary variable S receives a code from the stored text string $M_i$ at Section 2b and at Section 2c a syllable hyphen code or coded hyphen code is converted (in effect equated) for comparison purposes to a regular hyphen code. Codes occurring in the text string that correspond to a shift in print point without printing are equated, in effect, to a single space code for comparison purposes by the logic of Section 2d.

At Section 2e, codes that represent line or text ending positions are detected and set a flag variable indicating a match failure. Codes that do not represent graphic or print point positioning codes are skipped over at Section 2f. If the address and stored codes are not the same, the logic of Section 2g determines whether the codes being tested correspond to a character that is represented by two different codes, e.g. the period and the comma which print the same for upper and lower case. Such codes are equated for comparison purposes and in the preferred embodiment advantage is taken of the fact that one particular code bit has been reserved to distinguish upper case from lower case. If, after equating such characters that are represented by more than one code, the compare still fails, a flag variable (MATCH FAIL FLAG) indicating that fact is set. At Section 2h, a check is made to assure that at least one graphic was a part of the comparison.

LOGIC TABLE 6
See If There is a Match

| | |
|---|---|
| Sec 1 | set GRAPHIC FOUND FLAG = 0 |
| ° | set MATCH FAIL FLAG = 0 |
| ° | set k = 1 |
| Sec 2 | WHILE k ≦ t AND MATCH FAIL FLAG = 0 |
| ° | DO |
| ° | set U = $T_k$ |
| Sec 2a | IF U = space |
| ° | THEN CALL (Position Keyed Characters Beyond Space) |
| ° | ELSE set the GRAPHIC FOUND flag = 1 |
| ° | ENDIF |
| ° | REPEAT |
| Sec 2b | set k = k + 1 |
| ° | set S = $M_i$ |
| Sec 2c | IF S = syllable hyphen code or coded hyphen code |
| ° | THEN set S = regular hyphen code |
| Sec 2d | ELSE IF S = space code, coded space code, tab code, or indent code |
| ° | THEN CALL (Position Memory Beyond Space) |
| ° | set S = space code |
| ° | ENDIF |
| ° | ENDIF |
| ° | set i = i + 1 |
| Sec 2e | IF S = separator code, carrier return code, required carrier return code, indent clear code, or index code |
| ° | THEN set MATCH FAIL FLAG = 1 |
| Sec 2f | ELSE IF S = space code or graphic code |
| ° | THEN IF S ≠ U |
| Sec 2g | THEN IF S is an upper case period code or lower case period code or upper case comma code or lower case comma code |
| ° | THEN IF S ≠ U without using shift bit in compare |
| ° | THEN set MATCH FAIL FLAG = 1 |
| ° | ENDIF |
| ° | ELSE set MATCH FAIL FLAG = 1 |
| ° | ENDIF |
| ° | ENDIF |
| ° | ENDIF |
| ° | ENDIF |
| ° | UNTIL S = graphic code or space code OR MATCH FAIL FLAG = 1 |
| ° | ENDREPEAT |
| ° | ENDWHILE |
| Sec 2h | IF GRAPHIC FOUND FLAG = 0 |
| ° | THEN set MATCH FAIL FLAG = 1 |
| ° | ENDIF |
| ° | RETURN |

Logic 107 for skipping over multiple space codes in a text address is invoked by the text matching logic 106 of Logic Table 6. Such logic 107 is described in Logic Table 7 and basically involves an advancing of the address index. Logic 108 for examining the text string and equating print position shifting codes and also any adjacent shifting codes to a single space code is described in Logic Table 8. Again, an index incrementing operation advances the compare past these codes and the temporary variable S in Logic Table 6 is set to be the space code.

LOGIC TABLE 7
Position Keyed Characters Beyond Space

WHILE $T_{k+1}$ = space code AND k ≠ t
DO
set k = k + 1
ENDWHILE
RETURN

LOGIC TABLE 8
Position Memory Beyond Space

WHILE $M_{i+1}$ = space code, coded space code, tab code (F0 or F1) or indent code (F2 or F3)
DO
set i = i + 1
ENDWHILE
RETURN Referring to Logic Table 9, the logic 109 for printing from storage is described. Section 1 indicates generally a test for termination which, for the preferred implementation, may be a word ending code or a line ending code or a line found by a search (TO MODE) or at the operator's choice by selecting a key in conjunction with the PLAY key. Also, a second depression of the PLAY key is preferably treated as a command to stop. A loop (Sections 1–7) is initiated and a flag (the KEYED FLAG) is set to indicate codes are originating from storage and not the keyboard. A test is made at the start of Section 2 to determine whether the operator has selected the ADJUST mode (which action sets the ADJUST FLAT to 1) indicating that line ending will be automatically adjusted rather than printed as originally keyboarded. Syllable hyphens and discretionary carrier returns are deleted from the text string if they occur at a printer position (PPOS) to the left of the beginning of the return zone (here assumed as the right margin −5 character position increments) and a carrier return will not be inserted after a syllable hyphen that precedes the beginning of the return zone. At Section 2b, a space code which is followed by a graphic code triggers a transfer to logic 110 for scanning a word for inserting a carrier return (described below). The purpose of the logical testing of Section 2b is to locate a word beginning point and additional testing may be required if control codes, for example, can occur between a space and a graphic in circumstances where treatment as a word beginning is desired.

If the location for inserting a carrier return (stored in the variable INSERT CR LOCATION) is the present printing position (PPOS) then a carrier return is inserted at Section 3 using the PROCESS A CARRIER RETURN logic 102 described above with reference to Logic Table 2. At Section 4, the next code of the string is accessed.

Multisection tab codes are processed in Section 5 and eliminate any need to reference the present tab settings. The tab destination is determined by moving two additional storage locations ($M_{R+2}$) toward the trailing end to access the stored value for tab destination. The index i is then loaded with the number of storage locations that must be skipped for either a special multisection tab code or a special indent tab code. In Section 6, the pointer indexes for the reference locations in storage are incremented by the index i. Then with all of the above preparatory operations completed, a transfer is initiated in Section 7 to the process a character logic 101 described with reference to Logic Table 1.

LOGIC TABLE 9

| | Do a Play Operation |
|---|---|
| Sec 1 | While a termination code is not detected |
| Sec 1a | DO |
| • | (Note: the next character to be played is $M_r$) |
| • | set KEYED FLAG = 0 |
| Sec 2 | IF ADJUST FLAG = 1 |
| Sec 2a | THEN IF ($M_r$ is a syllable hyphen code or discretionary carrier return code) AND (PPOS < RT MARGIN - 5 AND ($M_r$ = SYLLABLE HYPHEN CODE AND INSERT CR LOCATION $\neq$ PPOS) |
| • | THEN delete the syllable hyphen or discretionary CR |
| Sec 2b | ELSE IF $M_r$ = graphic code and $M_p$ = space code |
| • | THEN CALL (Scan the Word for Inserting a Carrier Return) |
| • | ENDIF |
| • | ENDIF |
| • | ENDIF |
| Sec 3 | IF INSERT CR LOCATION = PPOS |
| • | THEN set the INSERTED CARRIER RETURN FLAG = 1 Set $C_1$ = CR code |
| • | CALL (Process a Carrier Return/Indent Clear) |
| • | ENDIF |
| Sec 4 | set i = 1 |
| • | set $C_1$ = $M_r$ |
| Sec 5 | IF $C_1$ = tab or indent tab (If $C_1$ = $F0_{16}$ or $F1_{16}$ or $F2_{16}$ or $F3_{16}$) |
| • | THEN set TAB DESTINATION = $M_{r+2}$ |
| • | set i = 4 |
| *IF $C_1$ = indent tab (F2 or F3) | |
| • | THEN set i = 5 |
| • | ENDIF |
| • | ENDIF |
| Sec 6 | set p = p + i |
| • | set r = r + i |
| Sec 7 | CALL (Process a Character) |
| • | ENDWHILE |
| • | RETURN |

Referring to Logic Table 10, logic 110 for adjusting text by checking the effect of individual words on line appearance is described. In Section 1, various flag variables are set that bear information indicated by their names. The end of the preceding word is stored in variable E2 in Section 2 including the effect of an inserted carrier return. A set of hyphen location indicators are initialized in Section 3 as is indexing variable i. The word end portion for the next word is calculated in the loop starting in Section 4 with control codes being treated specially in the loop starting at Section 4a. Section 5 serves to include word ending dashes in the word. At Section 6, the stop logic is provided for a hyphenate mode if selected by the operator and operator intervention is required to continue PLAY operation.

LOGIC TABLE 10

| | Scan the Word for Inserting a Carrier Return |
|---|---|
| Sec 1 | set the HYPHEN LEFT OF ZONE FLAG = 0 |
| • | DISCRETIONARY CR SCANNED FLAG = 0 |
| • | NON-HYPHEN GRAPHIC IN WORD FLAG = 0 |
| • | LAST CHARACTER WAS HYPHEN FLAG = 0 |
| • | SYLLABLE HYPHEN LEFT OF ZONE FLAG = 0 |
| • | HYPHENATED WORD FLAG = 0 |

LOGIC TABLE 10-continued

| | Scan the Word for Inserting a Carrier Return |
|---|---|
| • | HYPHENATION LOCATION FLAG = 0 |
| Sec 2 | IF INSERTED CR LOCATION $\neq$ PPOS |
| • | THEN set E2 = PPOS |
| • | ELSE set E2 = LEFT MARGIN |
| • | ENDIF |
| Sec 3 | set PREZONE HYPHEN and POSTZONE HYPHEN = $-1$ |
| • | set i = r |
| Sec 4 | REPEAT |
| • | CALL (Compute the Character's Escapement) |

Referring to Logic Table 11, logic 111 is described for computing a character escapement. At Section 1, flag variables are set for indicating that a hyphen or certain control codes have not been encountered as the only characters in the word. In Section 2, flag variables (having names descriptive of purpose) are set to indicate the occurrence of a hyphen code in a word and the location of the hyphen relative to the right margin. In Section 3, the escapement for the accessed code is added to the total E2 which, when accumulation is complete, indicates the end of the next word. The escapement value is accessed from ROS 14 (FIG. 1) in a table referenced to the text codes. If the code represents a syllable hyphen, no addition to the total occurs unless, based on the location for inserting a carrier return, the hyphen would be printed. In Section 4, the reverse escapement effect of a backspace operation is included in the WORD END total.

LOGIC TABLE 11

| | Compute the Character's Escapement |
|---|---|
| Sec 1 | IF $M_i \neq$ hyphen, continuous underscore, word underscore, index, or coded space codes |
| • | THEN set the NONHYPHEN GRAPHIC IN WORD FLAG = 1 |
| • | IF the HYPHEN LEFT OF ZONE FLAG = 1 |
| • | THEN set PREZONE HYPHEN = E2 |
| • | ENDIF |
| • | ENDIF |
| • | set HYPHEN LEFT OF ZONE FLAG = 0 and LAST CHARACTER WAS HYPHEN FLAG = 0 |
| Sec 2 | IF $M_i$ is a graphic code |
| Sec 2a | THEN IF $M_i$ is a hyphen code or syllable hyphen code and $M_{i-1} \neq$ space code |
| Sec 2b | THEN set the LAST CHARACTER WAS HYPHEN FLAG = 1 |
| Sec 2c | IF E2 < RT MARGIN - 5 |
| • | THEN set the HYPHEN LEFT OF ZONE FLAG = 1 |
| Sec 2d | ELSE IF RT MARGIN - 5 $\leq$ E2 < RT MARGIN |
| • | THEN set the HYPHENATION LOCATION FLAG = 1 |
| Sec 2e | ELSE IF POSTZONE HYPHEN = $-1$ or POSTZONE HYPHEN = E2 $-1$ |
| Sec 2f | THEN set POSTZONE HYPHEN = E2 |
| • | ENDIF |
| • | ENDIF |
| *ENDIF | |
| • | ENDIF |
| Sec 3 | IF $M_i \neq$ syllable hyphen code OR the HYPHEN LEFT OF ZONE FLAG = 0 |
| • | THEN set E2 = E2 + the escapement for this character (stored in a table in ROS 14) |
| • | ENDIF |
| Sec 4 | ELSE IF $M_i$ = backspace code |
| • | THEN set E2 = E2 $-$ 1 |
| • | ENDIF |
| • | ENDIF |
| • | RETURN |

Referring to Logic Table 12, logic 112 for inserting carrier returns establishes at Section 1 a set of zone boundaries (Z12, Z23, Z34, Z45 and Z56) for line adjustment that are related to the right margin. One of the boundaries (represented as the variable PAPER EDGE) corresponds to the usual location of the paper edge. A variable $E_3$ has been established by the logic 102 (Logic Table 2) with the stored value of the printer position for the ending of the last line. And variable $E_1$ contains as a result of the logic 101 (Logic Table 1) the end position for the last word printed. $E_2$ is the variable that contains the location code for the end of the next word to be printed. In Section 2, a variable POST ZONE HYPHEN is set to indicate the end of the next word if a hyphen can be used as a word break point. Also, the line ending logic of Sections 3–5 is not needed if there will be hyphen in the return zone or this is the first word of a line which is caused to be printed irrespective of end point. The variables $E_1$, $E_2$ and $E_3$ are compared to the zone boundaries in Section 3 for deciding whether or not to insert a carrier return.

In Section 4, a carrier return is inserted based on the above-discussed tests at the end of the last word printed, a check being made to account for a hyphen in the next word that would print before the return zone. If the tests determine that a carrier return is not to be inserted before the next word, then the variable INSERT CR LOCATION is loaded with the end of the next word in Section 5.

LOGIC TABLE 12

See Whereto Inset a Carrier Return

| | |
|---|---|
| Sec 1 | set Z23 = RT MARGIN − 5 |
| • | set Z34 = RT MARGIN |
| • | set Z12 = Z23 −5 |
| • | set Z45 = Z34 + 5 |
| • | set Z56 = Z45 +6 |
| • | (Note E3 = position on previous line where the last graphic was printed) |
| • | (Note E1 = position on current line where the last graphic was printed) |
| • | reset the LEFT SIDE and RIGHT SIDE FLAG to 0 |
| Sec 2 | IF POSTPOSTZONE HYPHEN ≠ −1 |
| • | THEN set E2 = POSTZONE HYPHEN |
| • | ENDIF |
| | IF the HYPHENATION LOCATION FLAG = 0 |
| | (a hyphen is not in the return zone) AND E1 ≠ 0 |
| | (this is not the first word to be printed on this line) |
| Sec 3 | THEN IF E2 > Z45 |
| • | THEN IF E2 > Z56 |
| • | THEN set the LEFT SIDE FLAG = 1 |
| • | ELSE IF E1 < Z12 |
| • | THEN set the RIGHT SIDE FLAG |
| • | ELSE set the LEFT SIDE FLAG |
| • | ENDIF |
| • | ENDIF |
| • | ELSE IF E3 < Z12 OR E3 > Z45 OR (Z23 < E3 ≦ Z34) |
| • | THEN IF E1 > Z12 |
| • | THEN IF Z23 − E1 < E2 − Z34 |
| • | THEN set the LEFT SIDE FLAG |
| • | ELSE set the RIGHT SIDE FLAG |
| • | ENDIF |
| • | ELSE set the RIGHT SIDE FLAG |
| • | ENDIF |
| • | ELSE IF E3 < Z23 AND E1 < Z23 |
| • | THEN set the LEFT SIDE FLAG |
| • | ELSE set the RIGHT SIDE FLAG |
| • | ENDIF |
| • | ENDIF |
| • | ENDIF |
| Sec 4 | IF the LEFT SIDE FLAG is set |
| • | THEN IF PREZONE HYPHEN = −1 |
| • | THEN set INSERT CR LOCATION = E1 |
| • | ELSE set INSERT CR LOCATION = PREZONE HYPHEN |
| • | ENDIF |
| Sec 5 | ELSE set INSERT CR LOCATION = E2 |

LOGIC TABLE 12-continued

See Whereto Inset a Carrier Return

| | |
|---|---|
| • | ENDIF |
| • | ENDIF |
| • | RETURN |

Referring to Logic Table 13, logic 113 for erasing a code from text storage is described. At Section 1, separator codes are detected and, for such codes, no erase action is taken. Multisection codes are detected at Section 2 to permit special processing of such codes. If a multisection code is not an indent tab or indent clear, it is a tab code (F0 or F1) and can be erased. At Section 2b, the tab shift distance and tab destination sections of a destination tab code are decremented by one unit for each erase operation. When the shift distance is decremented to zero, as determined at Section 2c, the leading reference address in storage is shifted so that the multisection tab code is in the empty storage gap (effectively erased). A shift command is sent to the printer at Section 2d. For codes other than the special multisection codes, the normal erase procedures are used. Since automatic erase operation is known and does not bear a close relationship to the invention, a detailed description will not be provided.

LOGIC TABLE 13

Erase

| | |
|---|---|
| Sec 1 | IF $M_p$ ≠ separator code |
| Sec 2 | THEN IF $M_p$ = multisection code (Fx) |
| Sec 2a | THEN IF $M_p$ ≠ indent tab (F2, F3) or indent clear (F6) |
| • | THEN |
| Sec 2b | set $M_{p-2} = M_{p-2} - 1$ (space counts) |
| • | set $M_{p-1} = M_{p-1} - 1$ |
| Sec 2c | IF $M_{p-2} = 0$ |
| • | THEN set p = p−4 |
| • | ENDIF |
| Sec 2d | Move the printer 1 space backward by sending distance and direction data to decoder 52 of interface 4 (FIG. 3) |
| • | ENDIF |
| Sec 3 | ELSE erase the character (e.g. set p = p−1 and send erase signals to interface 4 |
| • | ENDIF |
| • | ENDIF |

Text store operation is triggered, for example, using a STORE FLAG which is toggled between the zero and one states in response to the code indicating the STORE key has been depressed (see Logic Table 14 which describes the logic 114). Additional sophistication may be provided to permit storage of individually retrievable documents as is known in the art.

LOGIC TABLE 14

Store

| |
|---|
| IF $C_1$ = Store Code |
| THEN invert STORE FLAG |
| ENDIF |
| RETURN |

In the delete mode of operation, according to a presently preferred implementation, the codes to be deleted from a text string are caused by a shift in reference point location r to come within the gap of "empty storage" so as to be effectively deleted from the text string (see Logic Table 15 which describes the logic 115). If a word or line mode has been selected, the destination memory position must be determined by searching for a word or line ending, respectively, as is known in the art.

LOGIC TABLE 15

Delete

```
IF "TO" FLAG = 1
  THEN q is the final memory position for the delete
  ELSE find q (e.g. line, word) based on type of
  location
ENDIF
set r = q
RETURN
```

The logic for advance and return operations is described in Logic Table 16. At Section 1, it is determined if the reference point destination has already been identified by a content-addressed ("TO" mode) search. If not, the destination is determined according to the selected mode (e.g. line, word) by scanning for a corresponding ending code as is known in the art.

In Section 2, a direction indicator i is established to indicate the direction of reference point movement is toward the leading end (return) or trailing end (advance) of text storage. The shifting of the reference point is effected in logic 117 (Logic Table 17) that is entered by a branching operation at Section 3.

At Section 4, a temporary index j is set to the location p of the leading end (of the empty space gap) reference position and a temporary variable (ESCAPEMENT) for storing print position shifts is initialized to zero. Print position shifts are accumulated in Section 5 for codes toward the leading end of storage until the beginning of the line is located by encountering a code such as a carrier return code. If a destination tab code ($F0_{16}$ or $F1_{16}$) is encountered, the shift distance is extracted from the portion of the multisection code containing such information (the second byte of four) and the index j is reduced to move to the next code. For other codes, the print position shift is determined from a stored table (data stored in ROS 14, FIG. 1) and added to the total. At Section 6, the total in the variable ESCAPEMENT is referenced to the active left margin and the shift from the present printing position PPOS is sent to the interface 4 to cause a print position shift.

LOGIC TABLE 16

Advance/Return

```
Sec 1   IF "TO" FLAG = 1
          THEN q is the final memory position for the operation
          ELSE find q based on type of operation (e.g.
          line, word)
          ENDIF
Sec 2   IF C = Advance Code
          THEN set i = +1
          ELSE set i = -1
          ENDIF
Sec 3   CALL (Shift Memory to the New Position)
Sec 4   set j = p
        set ESCAPEMENT = 0
Sec 5   WHILE M_j ≠ separator code, carrier return code,
        required carrier return code, indent
        clear code, or indent tab code
        DO
Sec 5a  IF M_j = destination tab code (F0, F1)
          THEN set ESCAPEMENT = ESCAPEMENT +
          M_{j-2} set j = j-3
          ELSE add stored escapement value corresponding
          to the character to ESCAPEMENT
          ENDIF
        set j = j-1
        ENDWHILE
Sec 6   set DELTA = ACTIVE LEFT MARGIN +
        ESCAPEMENT - PPOS
        send DELTA positioning data to decoder 52 (FIG. 3)
```

LOGIC TABLE 16-continued

Advance/Return

```
        RETURN
```

The logic 117 for shifting to a new position in text storage that is entered from the advance/return logic 116 of Logic Table 16 is described in Logic Table 17. A test is performed at Section 1 to determine when the destination location (q) has been reached for either advance or return operation. At Section 2, a temporary index k is initialized to pointer r or p, respective of whether an advance or return operation is being performed.

In Section 3, a temporary variable s receives $M_k$. The active left margin is changed in Section 4a in recognition of an advance past an indent tab code. For a positive indent tab (F2) the destination stored at the third section of the multisection indent tab code is added to the active left margin. For a negative destination tab code (F3), the tab destination is subtracted from the active left margin. When a return operation over an indent tab occurs, the active left margin is restored to the value that it had when the indent tab was originally keyed (represented at the second segment (byte) of the indent tab code from the trailing end).

At Section 5, an indent clear code is detected and for advance operation (Section 5a), the active left margin is shifted to coincide with the permanent left margin. If a return operation over an indent clear code is detected, Section 5b sets the active left margin to coincide with the left margin stored in the section of the indent clear code at location k-1.

At Section 6, indexes p and r are adjusted for a shift beyond the present code including the extra shift for the multisection tab codes and indent tab codes.

LOGIC TABLE 17

Shift Reference to New Position

```
Sec 1   WHILE r ≠ q AND p-1 ≠ q
        DO
Sec 2   IF i = +1
          THEN set k = r
          ELSE set k = p
          ENDIF
Sec 3   set S = M_k
Sec 4   IF S = indent tab code (F2 or F3)
Sec 4a    THEN IF = +1
            THEN IF S = F2
              THEN set ACTIVE LEFT MARGIN = M_{k+2}
              (tab destination) + ACTIVE
              LEFT MARGIN
              ELSE set ACTIVE LEFT MARGIN = ACTIVE
              LEFT MARGIN - M_{k+2}
            ENDIF
Sec 4b    ELSE set ACTIVE LEFT MARGIN = M_{k-1} (old
          left margin)
          ENDIF
Sec 5   ELSE IF S = indent clear code (F6)
Sec 5a    THEN IF i = +1
            THEN set ACTIVE LEFT MARGIN =
            PERMANENT LEFT MARGIN
Sec 5b      ELSE set ACTIVE LEFT MARGIN =
            M_{k-1} (previous left margin)
          ENDIF
        ENDIF
        ENDIF
Sec 6   set n = number of sections in code
        (F0, F1 set n = 4
        F2, F3 set n = 5
        F6 set n = 3
        all others set n = 1)
        set p = p + n × i
        set r = r + n × i
```

| LOGIC TABLE 17-continued |
|---|
| Shift Reference to New Position |
| * ENDWHILE |

Figure 9:
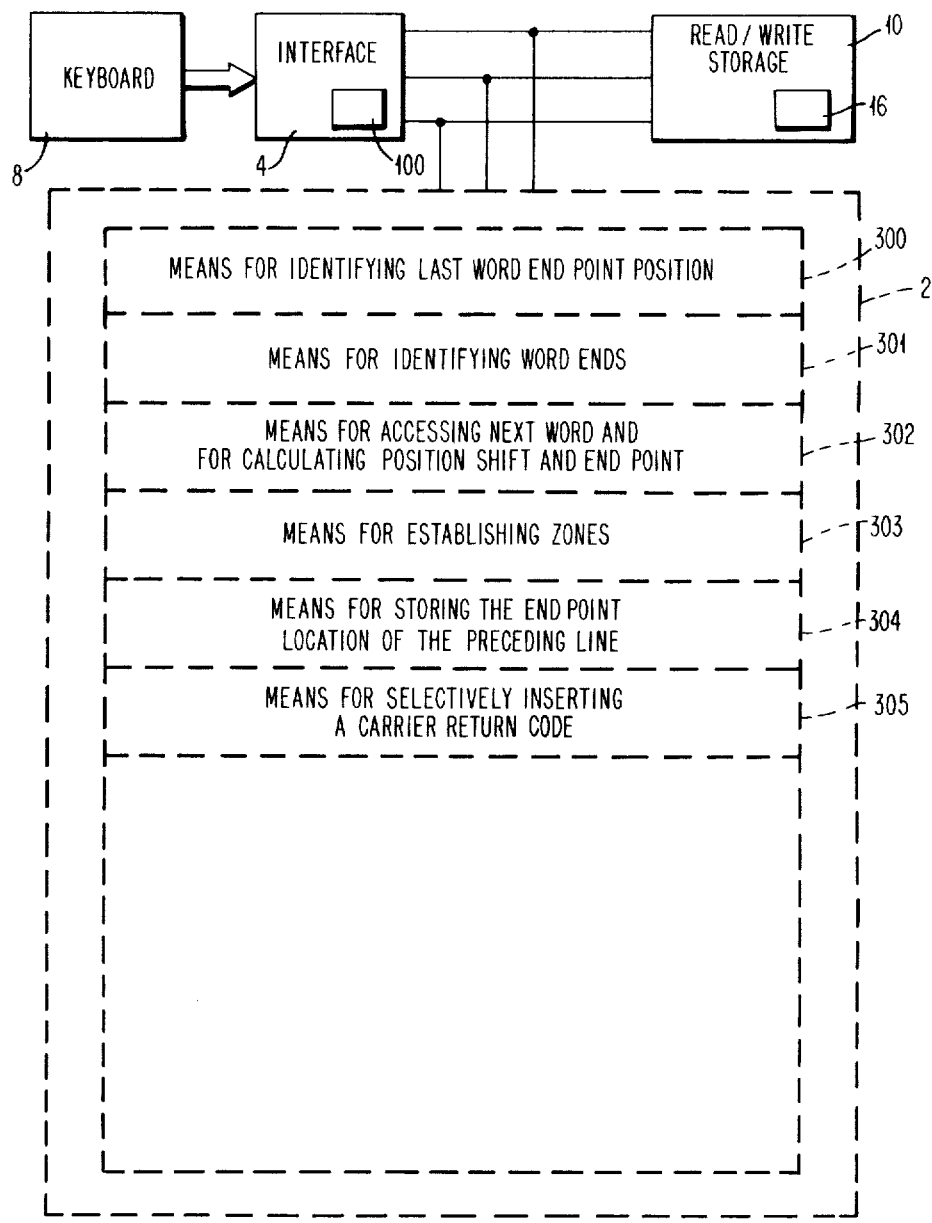
FIG. 9 is a block diagram emphasizing signal processing logic partitioned according to certain logic functions significant to the invention.

Referring to FIG. 9, the logic device 2 may be considered as being partitioned to include logic segments (Blocks 300-305) for purposes of identifying various functions significant to the present invention. Means for identifying the last word end point (Block 300) preferably stores in coded form the position of the last character printed on the line and relates to variables PPOS and $E_1$, as is described with reference to Section 8 of Logic Table 1. Means for identifying word ends in a text string (Block 301) relates to section 4a of Logic Table 10. Means for accessing the next word and for calculating a print position shift and end point (Block 302) relates mainly to Section 4 of Logic Table 10 and Logic Table 11 where the variable $E_2$ is evaluated. Means for establishing zones (Block 303) relates to Section 1 of Logic Table 12 where preferably five zone boundaries are defined with reference to the right margin. Means for storing the end point location for the preceding line (Block 304) relates to Section 5 of Logic Table 2. Means for selectively inserting a carrier return code (Block 305) relates mainly to Sections 2-5 of Logic Table 12. Selective insertion of a carrier return code is preferably effected according to comparisons of the position variables $E_1$, $E_2$ and $E_3$ relative to a set of zone boundaries ($Z_{12}$, $Z_{23}$, ...) as specified in the "IF" tests of Section 3 of Table 12 (see also Table 3).

The invention and a presently preferred implementation thereof have been described in detail. It will be appreciated, however, that variations and modifications within the scope of the invention will be suggested to those skilled in the art. For example, various types of printers may be employed in implementing the invention including non-impact printers such as ink jet printers. Also, various logic devices may be employed to implement the invention including discrete device type logic.

What is claimed is:

1. For use in a typewriter of the kind that can print a string of text that is accessed from storage in coded form, such printing occurring along lines having a desired end point established by a stored right margin position code, a system for inserting carrier returns to control line length during playback from storage, such system comprising:
    means for maintaining a position count indicative of the current line location as printing is performed;
    means for storing a line location code which corresponds to the end point of the last word that was printed from the text string;
    means for identifying the end point of the next word of the stored text string;
    means for accessing codes for the next word of the text string and for calculating based on the shift in print position represented by such codes, the potential end point location for printing the word on the present line;
    means for establishing zones extending along the print line including a fixed length return zone before the right margin and at least one zone on either side of said return zone, said establishing means including means for storing codes representing at least five zone separation boundary locations;
    means for identifying said last word and said next word end point locations with respective corresponding zones, said identifying means including means for comparing said last word and next word end point locations with said zone separation boundary location codes to identify corresponding zones; and
    logic means for selectively inserting a carrier return operation, prior to printing said next word, in accordance with a predetermined pattern of selection for the various zone combinations presentable by said end point locations.

2. A line end initiating system for a typewriter that includes means for printing characters in lines and means for storing sequences of printing operations in coded form, means for causing said printing means to play out a stored code sequence, means for defining the print position shift along a line corresponding to respective printing operations, means for establishing a right margin position for a line, and means for maintaining a count representing the present printing position along a line, said system comprising:
    word separating means for detecting predefined word ending codes for code groupings in a sequence that is accessed from storage played out to said printing means;
    means for identifying the print position end point for the last said grouping printed;
    means, cooperating with said word separating means, for accessing sequence codes for the next said grouping to be printed and for accumulating the print position shifts for said accessed codes established by said shift defining means to calculate the prospective end point for the next grouping to be printed based on the last grouping end point;
    means for storing the print position at which a line end signal last occurred; and
    means for comparing said last grouping end point and said next grouping end point respective of a predefined plurality of zone boundary positions and the stored position for the last occurring line ending signal, said comparing means cooperating with means for selectively inserting a line end signal prior to printing said next grouping in accordance with the results of such comparison.

3. A system according to claim 2 wherein there are a plurality of said zone boundary positions that are referenced to said right margin position.

4. A system according to claim 2 wherein an extreme zone boundary position is defined to correspond to a position beyond which printing is not permitted.

5. For use in a typewriter of the kind that can print a string of text that is accessed from storage in coded form, such printing occurring along lines having a desired end point established by a stored right margin position code, a system for inserting carrier returns to control line length during playback from storage, such system comprising:
    means for maintaining a position count indicative of the current line location as printing is performed;
    means for storing a line location code which corresponds to the end point of the last word that was printed from the text string;
    means for identifying the end point of the next word of the stored text string;
    means for accessing codes for the next word of the text string and for calculating based on the shift in print position represented by such codes, the potential end point location for printing the word on the present line;

means for storing and end point location for a previous line of print;

means for establishing zones extending along the print line including a fixed length return zone before the right margin and at least one zone on either side of said return zone;

means for identifying said last word and said next word end point locations with respective corresponding zones; and logic means for selectively inserting a carrier return operation, prior to printing said next word, in accordance with a predetermined pattern of selection for the various zone combinations presentable by said end point locations, there being at least one combination of zones for said last and next word end locations for which said logic means inserts a carrier return respective of said previous line end point location.

* * * * *